United States Patent
Ramanathan et al.

(10) Patent No.: US 8,320,549 B2
(45) Date of Patent: Nov. 27, 2012

(54) ADVANCED CALL ROUTING USING LINKED IDENTITIES

(75) Inventors: Rajesh Ramanathan, Redmond, WA (US); Adrian Potra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 696 days.

(21) Appl. No.: 12/486,778

(22) Filed: Jun. 18, 2009

(65) Prior Publication Data
US 2010/0322402 A1 Dec. 23, 2010

(51) Int. Cl.
*H04M 7/00* (2006.01)
(52) U.S. Cl. .................... 379/221.08; 379/219
(58) Field of Classification Search ............. 379/211.02, 379/212.01, 221.01, 88.19, 88.2
See application file for complete search history.

(56) References Cited

U.S. PATENT DOCUMENTS

| | | | | |
|---|---|---|---|---|
| 5,768,360 A | * | 6/1998 | Reynolds et al. | 379/211.02 |
| 6,134,530 A | * | 10/2000 | Bunting et al. | 705/7.25 |
| 6,298,130 B1 | * | 10/2001 | Galvin | 379/219 |
| 7,003,799 B2 | * | 2/2006 | Jorgenson | 726/12 |
| 7,095,838 B1 | * | 8/2006 | Kanerva et al. | 379/211.02 |
| 7,212,618 B1 | * | 5/2007 | Cooperman et al. | 379/142.05 |
| 2008/0270575 A1 | * | 10/2008 | Rodriguez | 709/219 |

* cited by examiner

*Primary Examiner* — Creighton Smith (57) ABSTRACT

Architecture for enabling user identities of callers to be collected from data sources and aggregated into respective meta-identities for each caller. Alternate user identities are searched, collected and associated with the meta-identity that can be a user name. A routing rule applied to the meta-identity is then applied across the alternate identities. The user identities can include a name of the caller, a phone number of the caller, or caller information collected from an external source. The phone numbers can include a partial phone number that is normalized into a full phone number format. The user identities can be mapped to the meta-identity and stored according to a hierarchy of confidence ratings. The user identities can be tagged with corresponding data source identifiers that designate respective data sources of the user identities. Conflict resolution is provided for selecting a suitable call routing path between callers having similar meta-identities.

20 Claims, 12 Drawing Sheets

ADVANCED CALL ROUTING USING LINKED IDENTITIES

BACKGROUND

In network communications systems, call recipients can receive a large volume of phone calls from different parties. Some incoming calls can be interruptions if the call recipient is busy with projects or deadlines. Other calls can be important and are answered even if the recipient is busy, such as calls from the recipient's supervisor or team collaborators.

In order to manage calls, call routing is performed. A call routing rule is applied to incoming calls, which can be routed according to priority. Calls from unknown callers or callers identified as low priority callers can be assigned a routing rule so that such calls are routed directly to voicemail, for example. High priority calls from a supervisor or team collaborators, for example, can be assigned a routing rule that allows the calls through to the recipient's phone.

In a typical network communications system, call routing can only be done for a single identity of a caller, such as a SIP URI of the caller of the form sip:someone@somewhere.com, as supported by a network communications server, or an internal numeric telephone number extension. An example of call routing is conditional forwarding if a call that is received originated from a specific extension.

Nowadays, a specific caller can have multiple identities such as that from free voice calling websites, mobile phone numbers, etc. People often exchange this contact information in business cards, enter the information in social networking applications, or maintain the information in customer applications by businesses, for example. Although call routing works well for a single phone number, having many identities from which calls can originate make call routing a complex, if not impossible, undertaking. This becomes even more problematic with the federation of public Internet clouds where an instant messaging client can initiate an IP voice call.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, architecture is disclosed for enabling multiple alternate identities (communications links) of a user (e.g., caller) to be aggregated in association with user meta-identity (e.g., user name). In the context of call communications, a call routing rule for the meta-identity applies to the alternate identities as well. With respect to a caller, the meta-identity includes the name of the caller and relates to each of the other aggregated alternate identities of the caller. In other words, the architecture allows for a user to select a caller and apply a call forwarding settings to the caller name. Thereafter, the architecture determines the linked identities such that if the caller calls from any one of the multiple identities, then the same call forwarding rule is applied.

A user can create a contact entry for a caller, add the caller name and caller information for alternate identities, which then link the alternate identities to the meta-identity. The alternate identities can include telephone numbers, such as an internal telephone extension, a full format telephone number, a mobile telephone number, a home phone number, one or more temporary phone numbers, and a SIP (session initiation protocol) URI (uniform resource identifier).

Upon receiving an incoming call via one of the alternate identities, a search is made for the corresponding meta-identity. After obtaining a meta-identity match, the corresponding call routing rule for that meta-identity is applied. If a meta-identity is not found, the system can tag the corresponding identity as "untied" (unlinked) and allow the user to add a name and create a new meta-identity for the new caller.

A rule is assigned to the meta-identity so that calls received on the communications server from any of the alternate identities of the caller are routed according to the rule. The rule can include routing the call to the phone of the user, routing to voicemail, forwarding to another phone number (e.g., a secretary) or temporary phone number, and assigning a high priority notification to the call, for example. Thus, any calls received from any of the alternate identities of the caller are routed in the same manner. The alternate identities can be collected and aggregated automatically by mining data sources of internal network sources and/or external sources, for example.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture enables user identities of a user (e.g., caller) to be collected from data sources, aggregated, and linked. As applied to call communications, a call routing rule assigned to a type of user identity, a meta-identity, is applied to other user identities, referred to as alternate identities, as well. For example, if a rule is to route all incoming communications from a caller to voicemail, then a call from the caller on a landline phone (a first alternate identity linked to the meta-identity) is routed to voicemail. Similarly, an IP call (a second alternate identity linked to the meta-identity) from the caller will be routed to voicemail. It is to be understood that multiple different rules can be imposed as desired by the user and/or architecture.

The user identities can include a name of the caller (a meta-identity), a phone number of the caller, or caller information collected from other sources (the alternate identities). The phone numbers can include a partial phone number that is normalized into a full phone number format. The alternate identities can be mapped to the meta-identity and stored according to a hierarchy of confidence ratings, and tagged with corresponding data source identifiers that designate respective data sources of the alternate identities. Conflict resolution is also provided for selecting a suitable call routing path between users having similar meta-identities.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
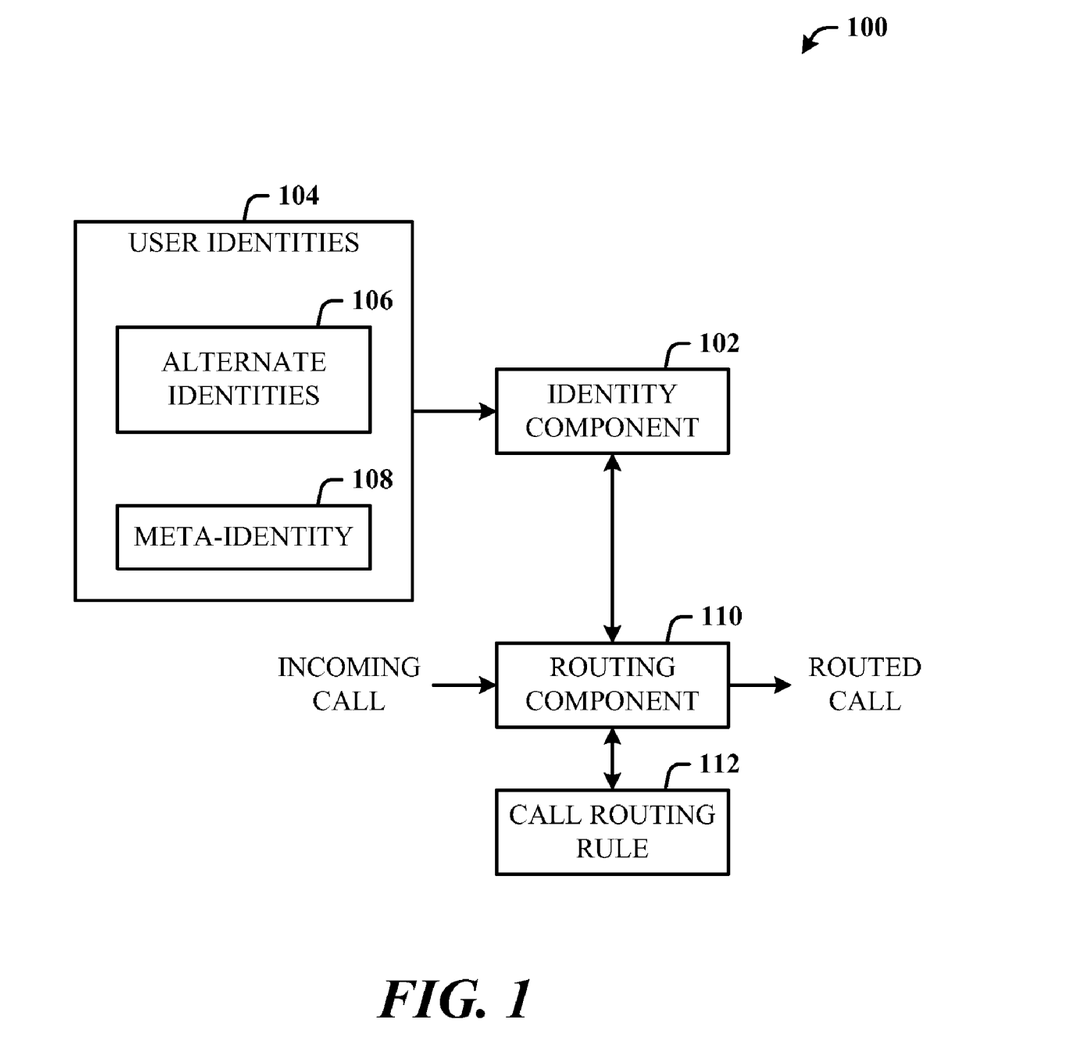
FIG. 1 illustrates a computer-implemented call routing in accordance with the disclosed architecture.

FIG. 1 illustrates a computer-implemented call routing system 100 in accordance with the disclosed architecture. An identity component 102 is provided that links user identities 104 of a communications infrastructure. The user identities 104 include alternate identities 106 and a meta-identity 108, as described in detail hereinbelow. A routing component 110 applies a call routing rule 112 (or multiple rules) designated to one of the identities 104 (alternate identities or meta-identity), to remaining identities (alternate identities or meta-identity) of the user identities 104. As a result, phone calls originating via any one of the user identities 104 are routed in the same manner, in accordance with the same routing rule 112. In this way, the meta-identity 108, for example, provides uniformity to identifying and properly routing calls from users employing multiple alternate identities.

One example of the call routing rule 112 allows the call to pass to the telephone of the user, so that the user can pick up the call or choose to let the call rollover to voicemail or a reception station. The call routing rule 112 can be configured to forward the call during travel, such as to a temporary number at a remote destination, or an administrative assistant or other delegate. The call routing rule 112 can assign a priority rating to the call, which can be interpreted by the caller. For example, a ring tone having a series of two short rings can indicate an urgent call from the supervisor. Alternatively, the call routing rule 112 can block the call altogether, if it is known to be an unwanted caller such as a telephone solicitor, for example. Further, the call routing rule 112 can automatically send the call to voicemail.

Figure 2:
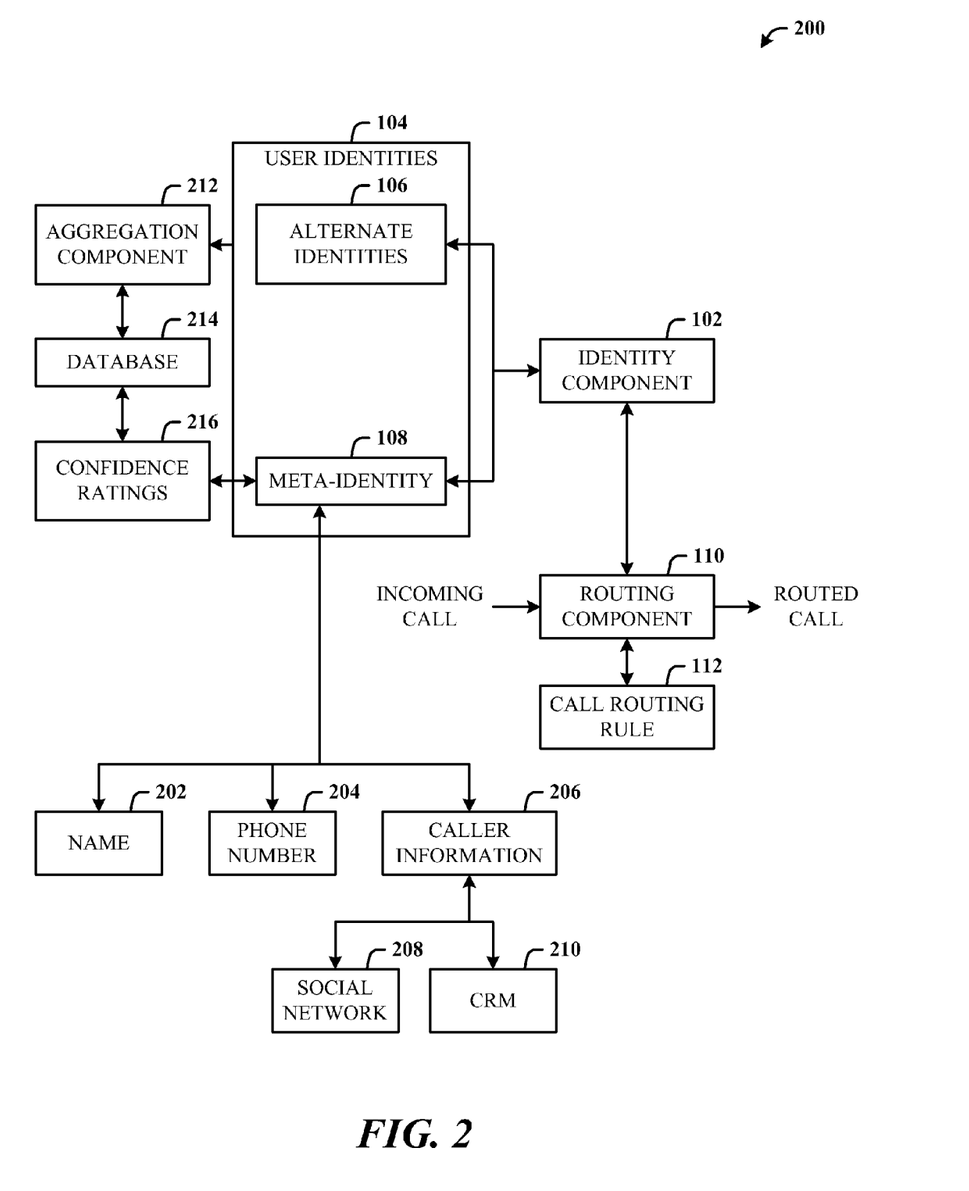
FIG. 2 illustrates an alternative embodiment of a call routing system that facilitates aggregation and definition of the meta-identity.

FIG. 2 illustrates an alternative embodiment of a call routing system 200 that includes facilitates aggregation and definition of the meta-identity 108. The meta-identity 108 can include a name 202 of a caller and a phone number 204 of the caller. The phone number 204 can be one of the alternate identities 106, and any phone number associated with the caller can be linked to the meta-identity 108. The alternate identities 106 can include telephone numbers associated with the caller, such as an internal enterprise telephone extension, a full format telephone number, a mobile telephone number, a home phone number, one or more temporary phone numbers, and an SIP URI, for example.

As also illustrated in FIG. 2, the meta-identity 108 can also include caller information 206 collected from a social network 208 and/or a customer relationship management (CRM) application 210, for example. Other related information can be linked to the meta-identity 108, such as an enterprise network identity, an identity associated with an Internet service, and an instant messaging (IM) identity, for example. The information collected through social networking sites and CRM applications can be linked to the meta-identity 108 and utilized for call routing decisions.

As additionally illustrated in FIG. 2, an aggregation component 212 is provided for aggregating and storing the user identities 104 in a database 214 such that each of the user identities 104 is hierarchically mapped to the meta-identity 108 according to confidence ratings 216. When matching the identities to the meta-identity 108, one of the sources of data is treated as a standard reference. The first instance of a contact becomes a standard reference identity, and subsequent user identities 104 added from other sources become subordinate to the standard reference identity, so that a hierarchy of user identities 104 is established.

During the process of routing calls, user identities 104 linked to different meta-identities are provided higher confidence ratings 216 than other meta-identities. For example, a phone number that is published in a network directory for a particular caller can be assigned a higher confidence rating than the same phone number published by a different individual in a social networking site. The confidence ratings 216 can be used as "tie breakers" when a user identity of a caller matches more than one meta-identity associated with different callers. The call routing rule 112 associated with the appropriate caller can then be applied.

Figure 3:
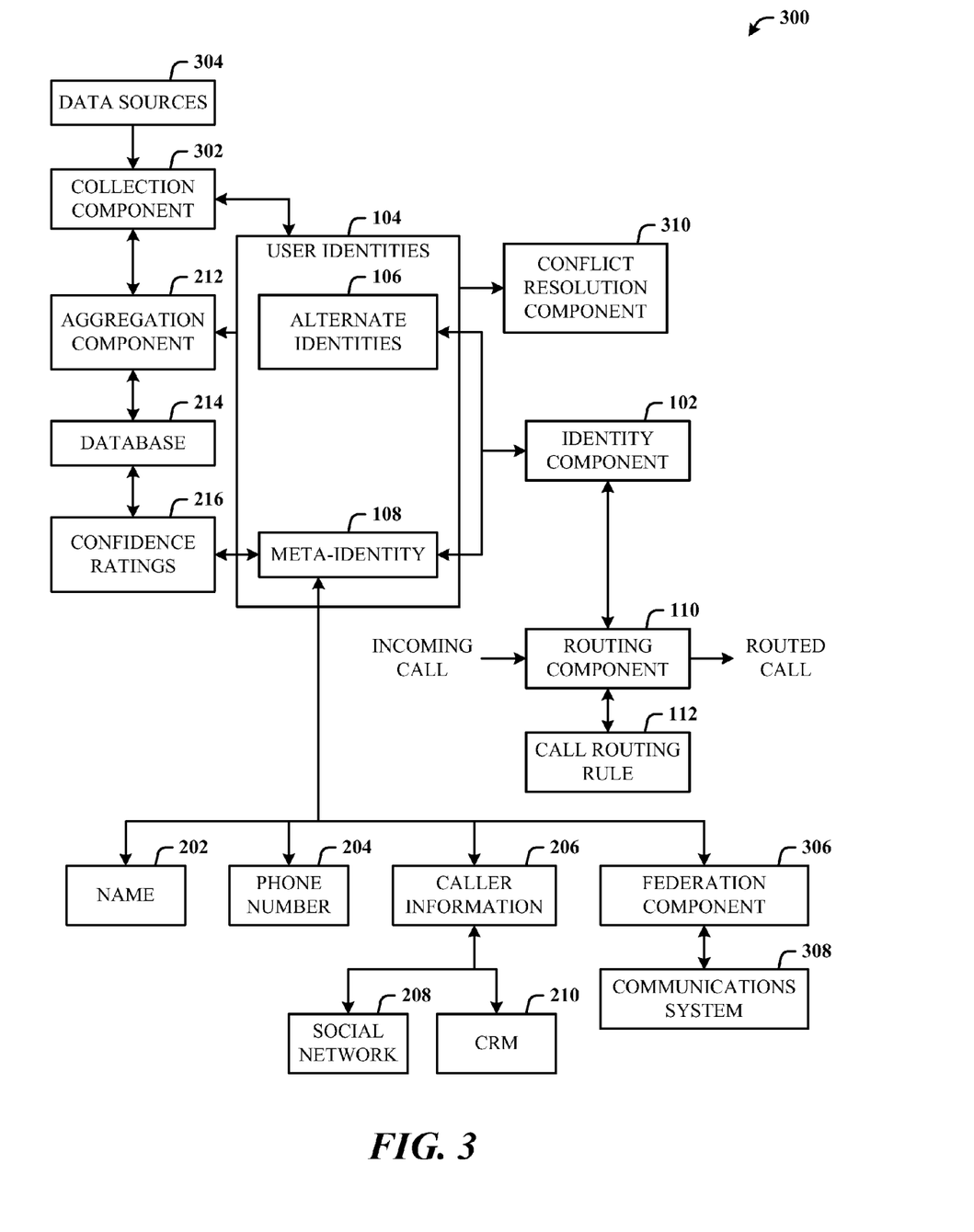
FIG. 3 illustrates an alternative embodiment of a call routing system that includes collection and management of the alternate identities.

FIG. 3 illustrates an alternative embodiment of a call routing system 300 that includes collection and management of the alternate identities. A collection component 302 is provided to collect the user identities 104 from data sources 304. The data sources 304 can be contact records stored in an email application or a network directory application, for example. The data sources 304 can also be other sources available from an external network or on the Internet, such as a social networking application, for example. The collection component 302 can be included in a single client such as a network communications application, or can be a dedicated information collection engine, for example.

As additionally illustrated in FIG. 3, a federation component 306 is provided for federating the meta-identity 108 to a different communications system 308, such as a shared enterprise network, for example. Through federation, a trust operation is established between multiple enterprises that can share identities of users. Information related to users and respective pertinent identities is available through the federated link. In this manner, the federation component 306 maintains consistent call routing functionality across enterprise networks and systems.

As further illustrated in FIG. 3, a conflict resolution component 310 is provided for resolving conflicts between callers having similar meta-identities. One or more meta-identities can contain similar sub-identities, such as a caller ID or a phone number, for example. The conflict resolution component 310 can present a user interface dialog to the user to enable an appropriate selection, and assists the user in selectively assigning prioritization or confidence ratings 216 that ensure the correct meta-identity 108 is selected for an incoming call.

Figure 4:
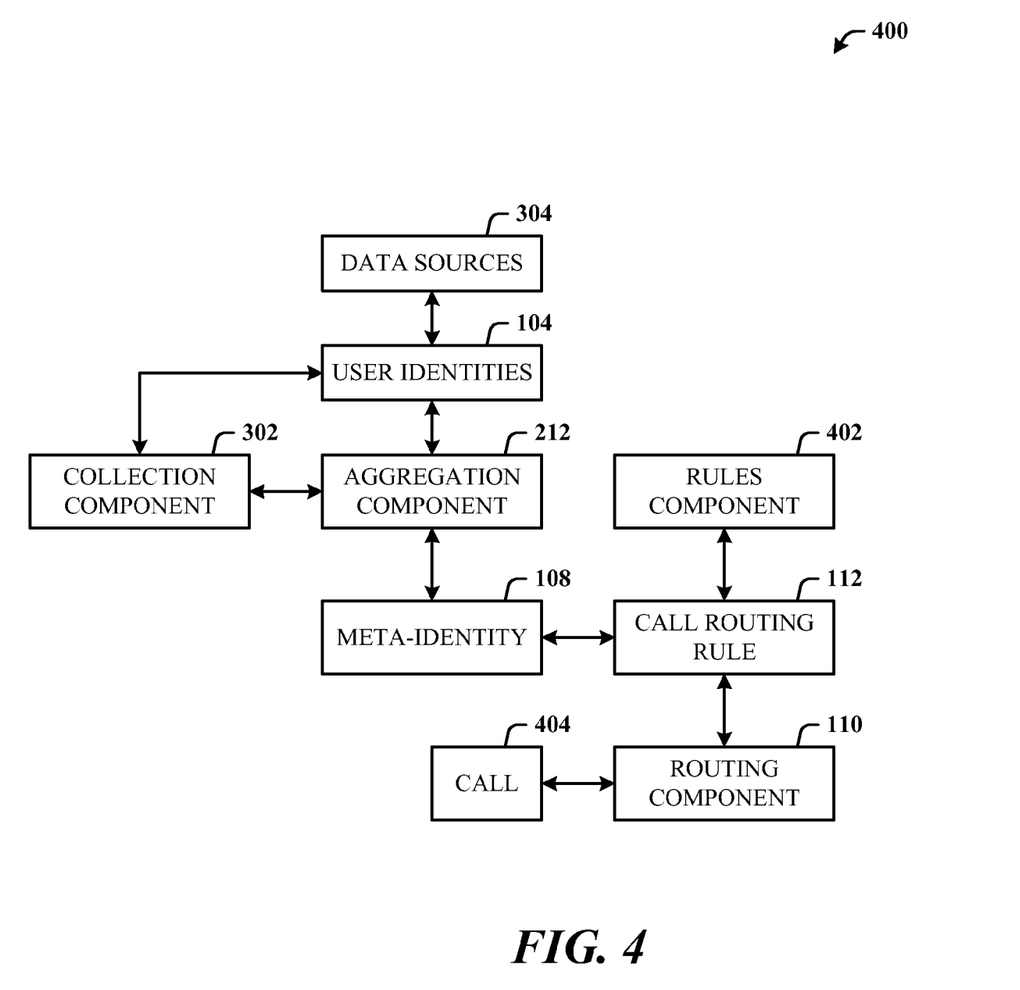
FIG. 4 illustrates an alternative embodiment of a call routing system.

FIG. 4 illustrates an alternative embodiment of a call routing system 400. The collection component 302 collects one or more user identities 104 of a caller of a communications infrastructure from the data sources 304. The collection component 302 accesses the data sources 304 and collects available information for callers, from network sources, or profile information in a user email application, for example. The aggregation component 212 associates the user identities 104 with a meta-identity 108. The aggregation component 212 sorts and compiles the user identities 104 received from the collection component 302.

As also illustrated in FIG. 4, a rules component 402 assigns the call routing rule 112 to the meta-identity 108. The routing component 110 applies the call routing rule 112 to a call 404 from the caller based on the meta-identity 108. A different call routing rule can be used for different instances, and can block a caller, and send a call to voicemail during business hours or after hours, for example. A specific call routing rule can forward a specific caller to an administrative assistant, a cell phone of the user, or a temporary phone number. The same call routing rule 112 can be applied to a particular caller regardless of any of the user identities 104 used by the caller.

Figure 5:
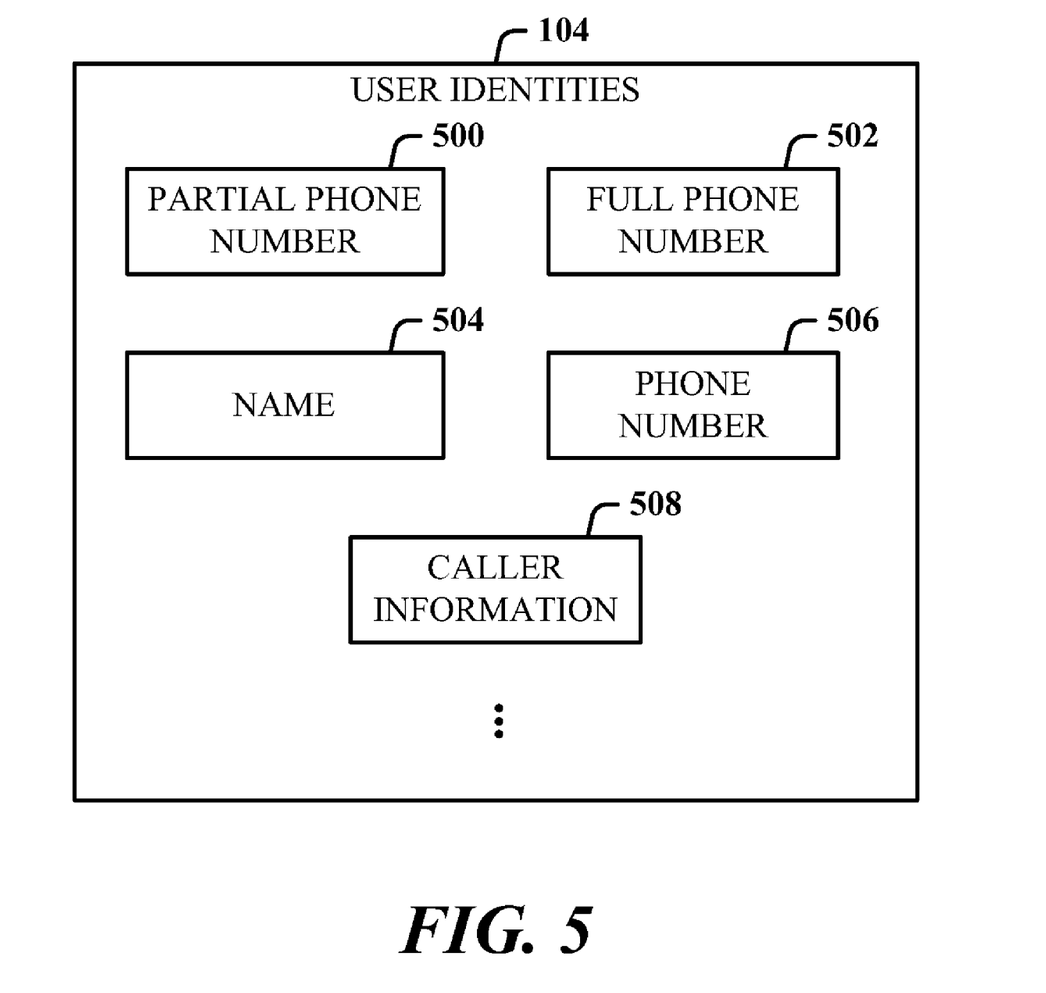
FIG. 5 illustrates types of user identities that can be employed with a call routing system.

FIG. 5 illustrates types of user identities 104 that can be employed with a call routing system. The user identities 104 can include a partial phone number 500 that is normalized into a full phone number 502 format. During aggregation, enterprise extension numbers, local seven-digit numbers and other partial phone numbers can be normalized to E.164 format, for example, so that the full phone number 502 can be mapped to an appropriate meta-identity. In this way, mapping of partial phone numbers to more than one contact from different enterprises or locations is avoided.

As also illustrated in FIG. 5, the user identities 104 can include a name 504, a phone number 506 of the caller, and/or caller information 508 collected from an external source. The phone number 506 can be a number associated with the caller, such as a mobile number, a residence number, SIP URI, or a temporary number used when located temporarily at a different location. The caller information 508 can be personal or other information gathered from sources such as email contact profiles, system login IDs, internal network information, and/or information gleaned from social networking applications, for example. The caller information 508 can be information other than user identities 104 and can be used for cross-reference purposes in locating additional user identities 104 from other sources. The user identities 104 are aggregated and linked to the meta-identity 108, which can be maintained in a database.

Figure 6:
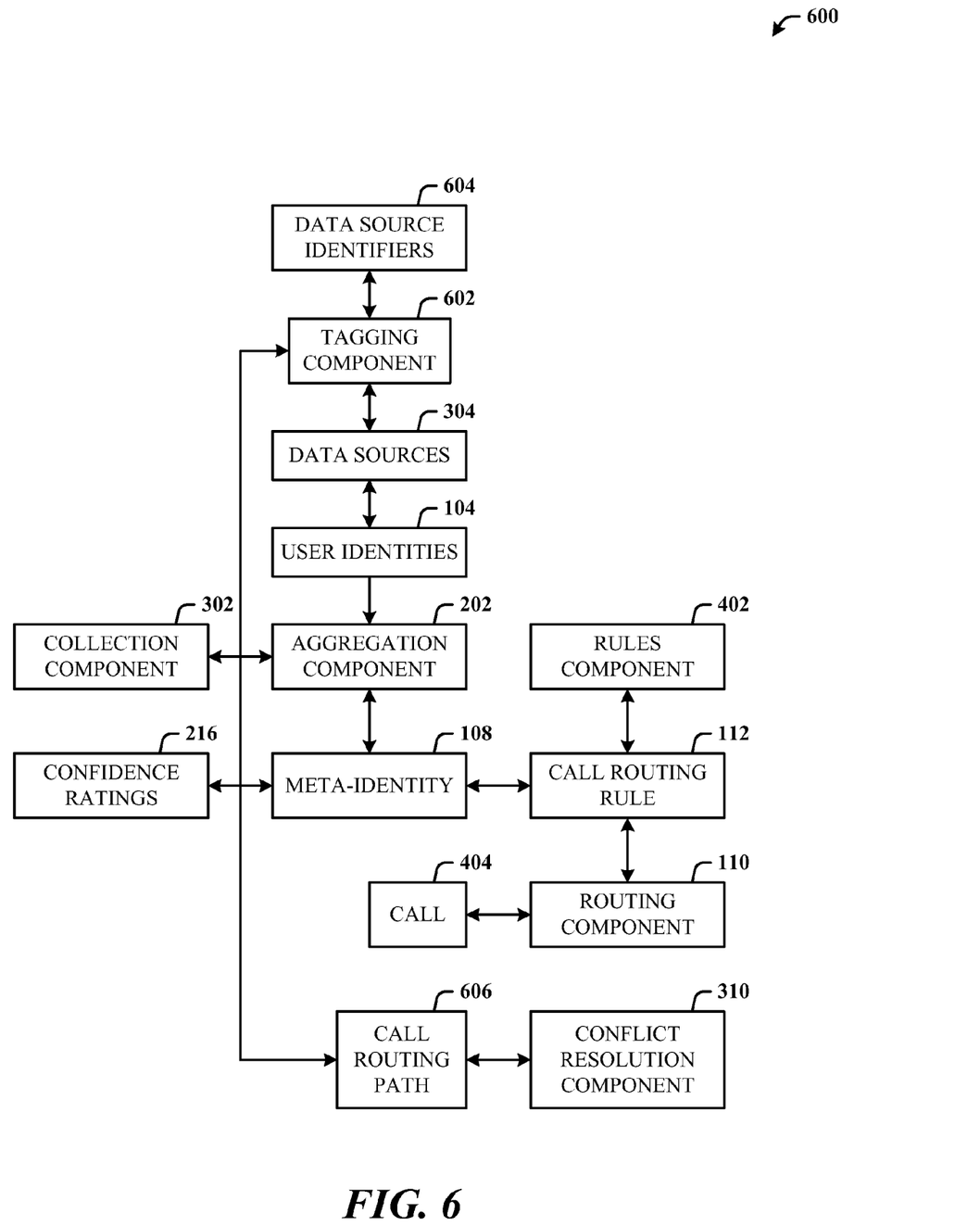
FIG. 6 illustrates an alternative embodiment of a call routing system that includes additional entities for tagging data sources and managing meta-identities.

FIG. 6 illustrates an alternative embodiment of a call routing system 600 that includes additional entities for tagging data sources and managing meta-identities. The user identities 104 are mapped to the meta-identity 108 and stored according to a hierarchy of confidence ratings 216. The confidence ratings 216 are developed from confidence data derived from factors such as data sources 304, for example. A data source indicating a primary work number or mobile number of a caller is extended a high confidence rating. The confidence ratings 216 can also include indications of whether the data source is a public phone system or an enterprise network. Metrics for the confidence ratings 216 can depend on other parameters such as a level of trust or a certain number of instances indicating a specific identity in various data sources 304, for example. Such factors can be used as weighting considerations in processing the confidence ratings 216.

As also illustrated in FIG. 6, a tagging component 602 is provided for tagging the user identities 104 with one or more corresponding data source identifiers 604 that designate respective data sources 304 of the user identities 104. The data source identifiers 604 are tags that relate the user identities 104 as stored in the meta-identity 108. For example, a phone number published at a social networking application website can be tagged with an appropriate data source identifier in the meta-identity 108 and included in a call routing map. An example of tag code can be as follows:

```
<caller type=phone>
    <source>http://www.social-
application.com/?id=1234</source>
    <lastrefreshtime />
    <master>sip:caller@nowhere-domain.com</master>
</caller>
```

As additionally illustrated in FIG. 6, the conflict resolution component 310 selects a call routing path 606 between callers having similar meta-identities based on the confidence ratings 216 of the corresponding data source identifiers 604. In this manner, a suitable decision can be made to identify the correct caller and properly route calls. An implementation for conflict resolution is illustrated in FIG. 8 hereinbelow.

Figure 7:
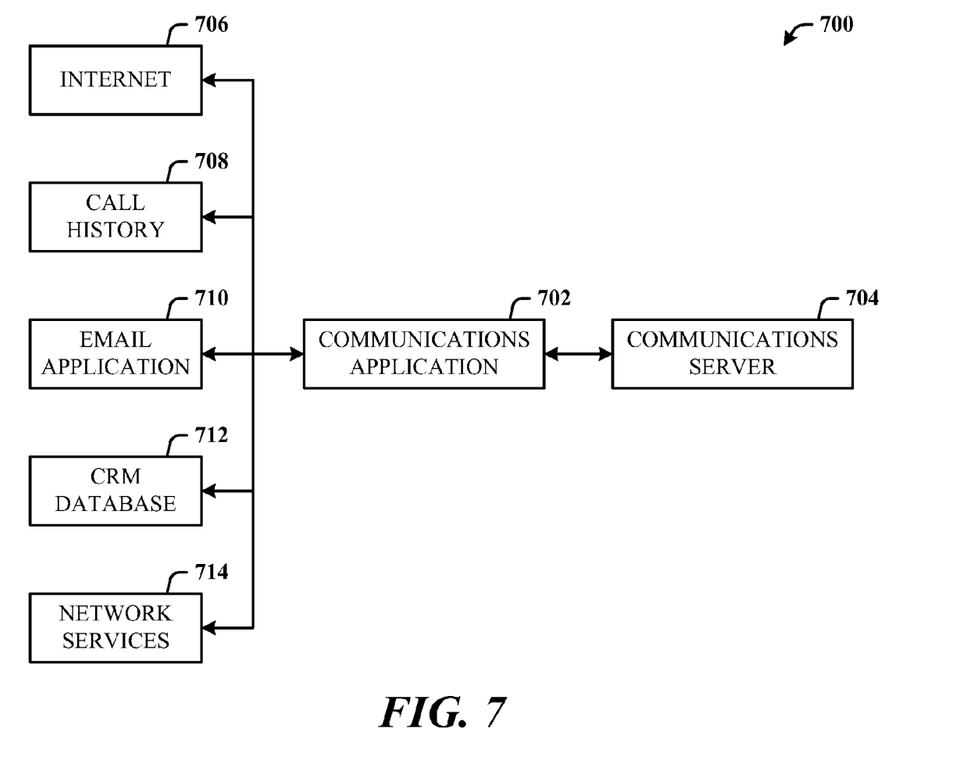
FIG. 7 illustrates an alternative embodiment of a system that includes aggregation and publication of caller information.

FIG. 7 illustrates an alternative embodiment of a system 700 that includes aggregation and publication of caller information. A communications application 702 sets call routing rules on a communications server 704 based on meta-identities aggregated into a database, as described hereinabove. The meta-identities can include a name and an identity of a caller, such as an SIP URI, for example. Other information related to callers can be aggregated from multiple sources by the communications application 702 and published to the communications server 704, which operates as a centralized routing engine.

As illustrated in FIG. 7, the sources can include the Internet 706, such as social networking websites, for example. The sources can also include call history 708, in which information such as caller IDs and phone numbers from previous phone calls can be obtained. For example, other sources can include an email application 710, a CRM database 712, and other network services 714 (e.g., available on the enterprise network). A user can manually add contacts, people or groups from any sources into the call routing configuration. The architecture ensures that appropriate meta-identities are selected and mapped appropriately so that the call routing occurs in the intended fashion.

Figure 8:
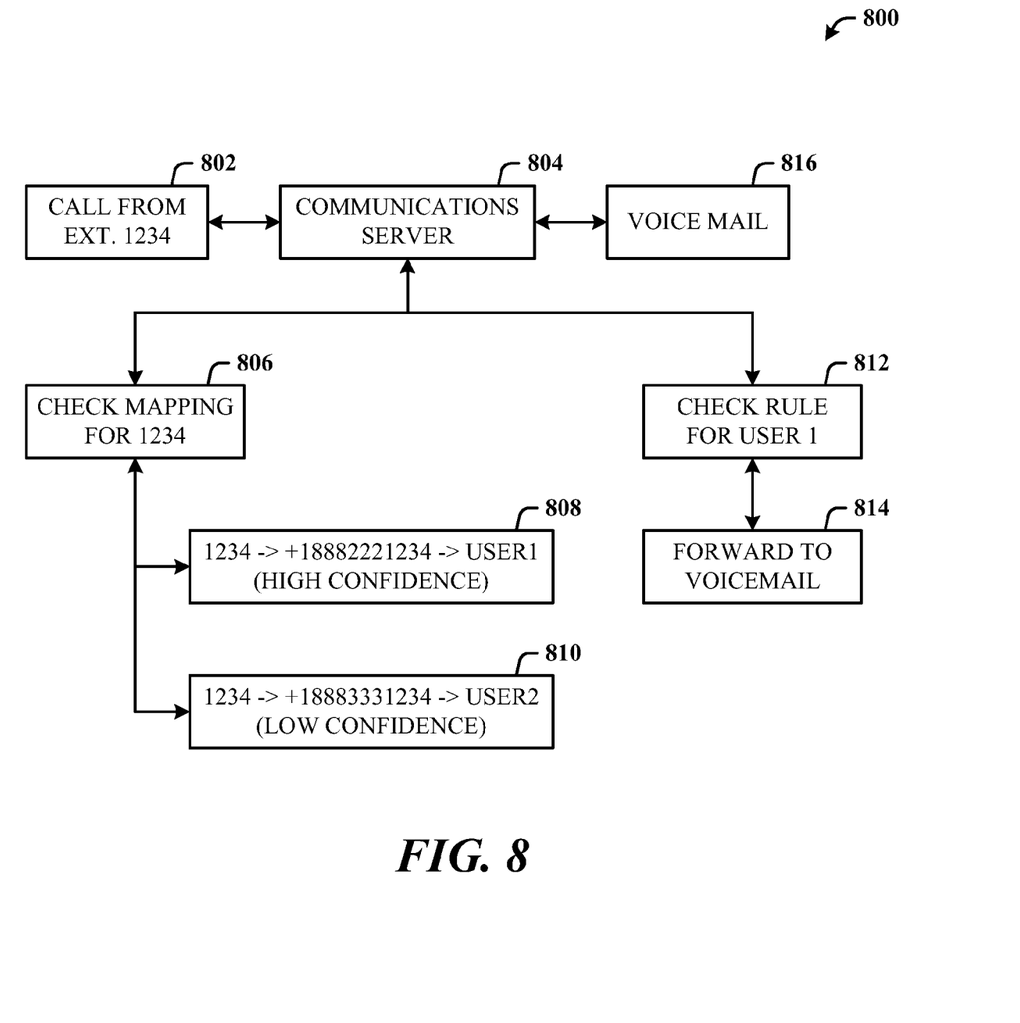
FIG. 8 illustrates a flow diagram of an alternative embodiment of a system that includes call routing based on aggregated information from a meta-identity.

FIG. 8 illustrates a flow diagram of an alternative embodiment of a system 800 that includes call routing based on aggregated information from a meta-identity in accordance with the call routing system. The application of call routing rules can be based on aggregated information from the meta-identity. An incoming call 802 is received from a caller on extension x1234 at the communications server 804 (similar to the communications server 704 of FIG. 7).

The communications server 804 processes the call 802 to determine the meta-identity associated with the caller. This is performed in two stages. At 806, the server 804 checks the mapping for extension x1234 to determine the meta-identity that corresponds to the extension. A meta-identity lookup reveals two full format numbers for extension x1234. At 808, a number+18882221234 is indicated as "high confidence" for User 1. At 810, a number+18883331234 is indicated "low confidence" for User 2, where the confidence levels are determined by the authoritativeness of the data source of the numbers.

Once the proper meta-identity is determined, the communications server 804 retrieves the corresponding call routing rule associated with the meta-identity for User 1. At 812, the rule is checked for User 1. At 814, the rule is discovered to be "forward to voicemail." The communications server 804 implements the rule and forwards the call to the voicemail 816 of the call recipient.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
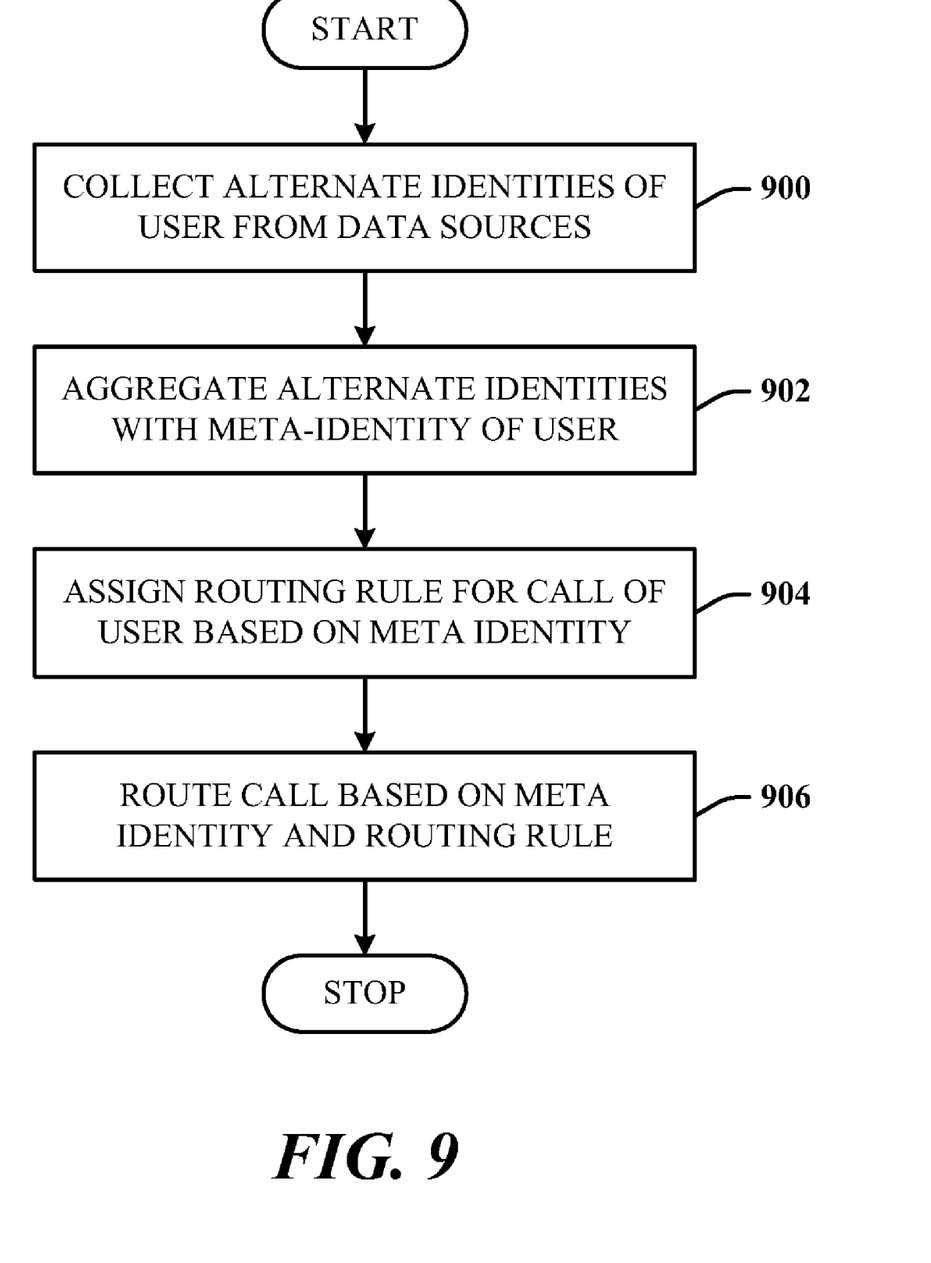
FIG. 9 illustrates a call routing method that provides advanced call routing using a meta-identity.

FIG. 9 illustrates a a call routing method that provides advanced call routing using a meta-identity. At 900, alternate identities of a user are collected from data sources. At 902, the alternate identities are aggregated with a meta-identity of the user. At 904, a routing rule is assigned for a call of the user based on the meta-identity. At 906, the call is routed based on the meta-identity and the routing rule.

Figure 10:
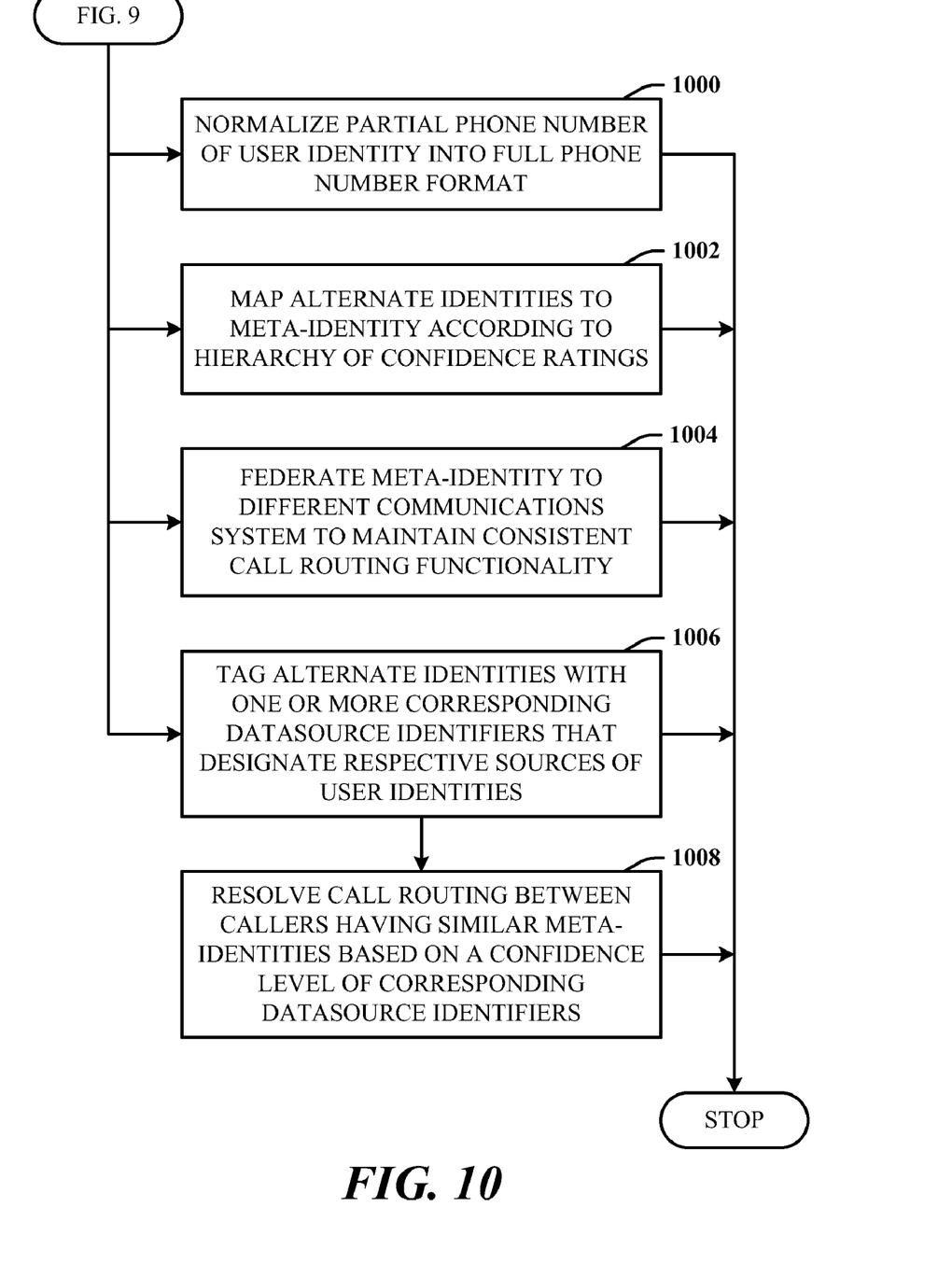
FIG. 10 illustrates additional aspects of the method of FIG. 9.

FIG. 10 illustrates additional aspects of the method of FIG. 9. At 1000, a partial phone number of an alternate identity is normalized into a full phone number format. At 1002, the alternate identities are mapped to the meta-identity according to a hierarchy of confidence ratings. At 1004, the meta-identity is federated to a different communications system to maintain consistent call routing functionality. At 1006, the alternate identities are tagged with one or more corresponding data source identifiers that designate respective sources of the user identities. At 1008, call routing between callers having similar meta-identities is resolved based on a confidence level of the corresponding data source identifiers.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
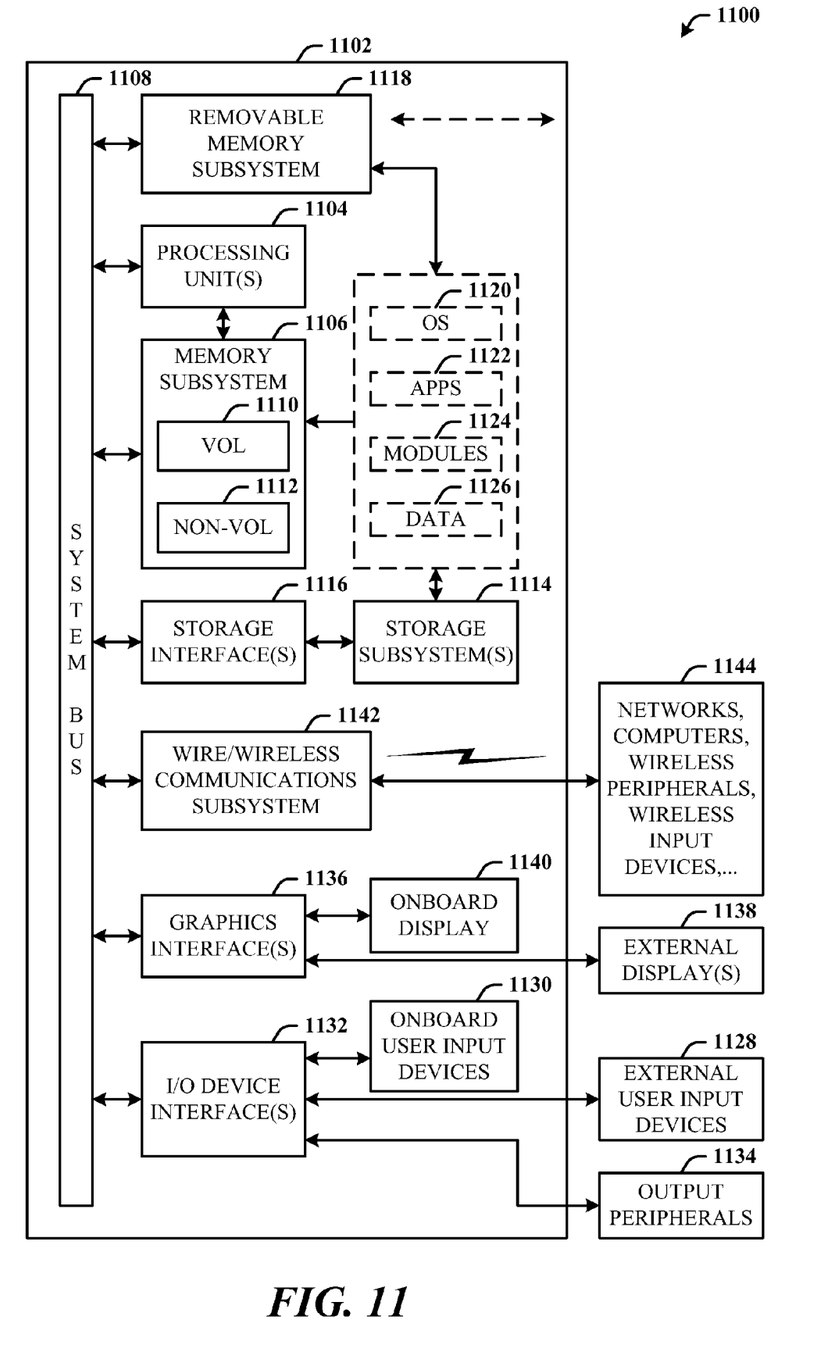
FIG. 11 illustrates a block diagram of a computing system operable to provide advanced call routing using linked identities in accordance with the disclosed architecture.

Referring now to FIG. 11, there is illustrated a block diagram of a computing system 1100 operable to provide advanced call routing using linked identities in accordance with the disclosed architecture. In order to provide additional context for various aspects thereof, FIG. 11 and the following discussion are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104, a system memory 1106, and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1106 can include volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the memory subsystem 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes storage subsystem(s) 1114 and storage interface(s) 1116 for interfacing the storage subsystem(s) 1114 to the system bus 1108 and other desired computer components. The storage subsystem(s) 1114 can include one or more of a hard disk drive (HDD), a magnetic floppy disk drive (FDD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a removable memory subsystem 1118 (e.g., flash drive form factor technology), and/or the storage subsystem(s) 1114 (e.g., optical, magnetic, solid state), including an operating system 1120, one or more application programs 1122, other program modules 1124, and program data 1126.

Generally, programs include routines, methods, data structures, other software components, etc., that perform particular tasks or implement particular abstract data types. All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The aforementioned application programs 1122, program modules 1124, and program data 1126 can be employed on a single computer system or employed on multiple computer systems, and include the computer-implemented system 100, the identity component 102, the user identities 104, the alternate identities 106, the meta-identity 108, the routing component 110, and the call routing rule 112 of FIG. 1, the system 200 including additional components such as the name 202, the phone number 204, the caller information 206, the social network 208, the CRM application 210, the aggregation component 212, the database 214, and the confidence ratings 216 of FIG. 2, the system 300 including additional components such as the collection component 302, the data sources 304, the federation component 306, the communications system 308, and the conflict resolution component 310 of FIG. 3, for example.

The aforementioned application programs 1122, program modules 1124, and program data 1126 can further include the system 400, which comprises additional components such as the data sources 304, the rules component 402, and the call 406 of FIG. 4, the additional user identities 104 in the form of the partial phone number 500, the full phone number 502, the name 504, the phone number 506, and the caller information 508 of FIG. 5, the system 600 that includes additional components such as the tagging component 602, the data source identifiers 604, and the call routing path 606 of FIG. 6, the system 700 including the communications application 702, the call history 708, the email application 710, the CRM database 712, and the network services 714 of FIG. 7, the system 800 that includes the incoming call 802, the communications server 804, the indicated actions, and the voicemail 816 of FIG. 8, and the methods of FIGS. 9-10, for example.

The storage subsystem(s) 1114 and memory subsystems (1106 and 1118) serve as computer readable media for volatile and non-volatile storage of data, data structures, computer-executable instructions, and so forth. Computer readable media can be any available media that can be accessed by the computer 1102 and includes volatile and non-volatile media, removable and non-removable media. For the computer 1102, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1102, programs, and data using external user input devices 1128 such as a keyboard and a mouse. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example. These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP) using logical connections via a wired/wireless communications subsystem 1142 to one or more networks and/or other computers. The other computers can include workstations, servers, routers, personal computers, microprocessor-based entertainment appliance, a peer device or other common network node, and typically include many or all of the elements described relative to the computer 1102. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wired/wireless communication subsystem 1142 (e.g., a network interface adapter, onboard transceiver subsystem, etc.) to communicate with wired/wireless networks, wired/wireless printers, wired/wireless input devices 1144, and so on. The computer 1102 can include a modem or has other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 12:
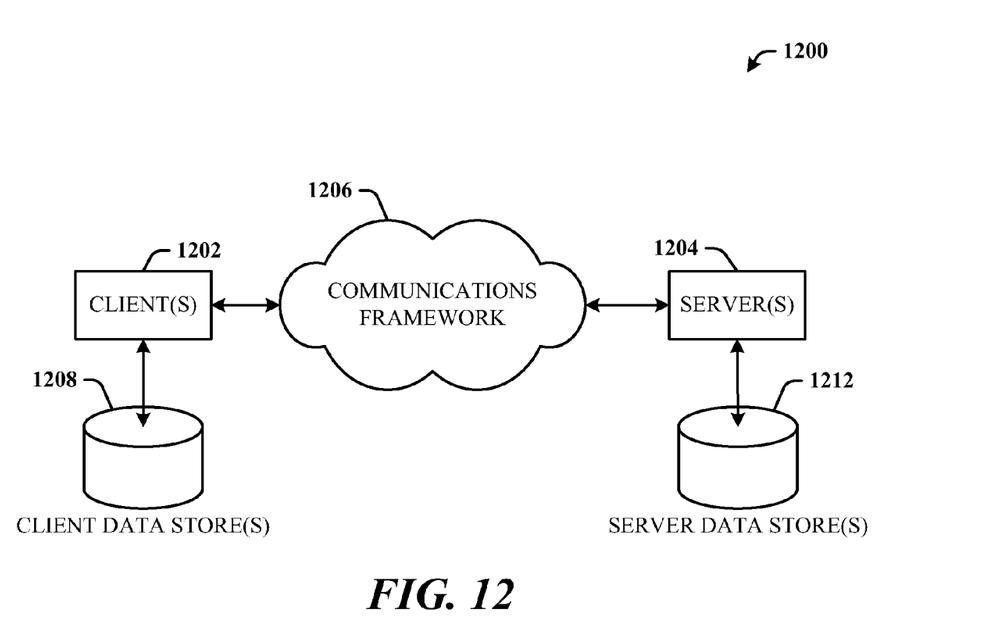
FIG. 12 illustrates an exemplary computing environment operable to provide advanced call routing using linked identities.

Referring now to FIG. 12, there is illustrated a schematic block diagram of a computing environment 1200 that can provide advanced call routing using linked identities. The environment 1200 includes one or more client(s) 1202. The client(s) 1202 can be hardware and/or software (e.g., threads, processes, computing devices). The client(s) 1202 can house cookie(s) and/or associated contextual information, for example.

The environment 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The environment 1200 includes a communication framework 1206 (e.g., a global communication network such as the Internet) that can be employed to facilitate communications between the client(s) 1202 and the server(s) 1204.

Communications can be facilitated via a wire (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented call routing system, comprising:
    an identity component for linking user identities of a communications infrastructure, the user identities include alternate identities and a meta-identity; and
    a routing component for applying a call routing rule designated to one of the identities, to remaining identities.

2. The system of claim 1, wherein the call routing rule for routing a call allows the call to pass, forwards the call, assigns a priority rating to the call, blocks the call, or sends the call to voicemail.

3. The system of claim 1, wherein the meta-identity comprises a name and a phone number of a user.

4. The system of claim 1, wherein the meta-identity comprises caller information collected from at least one of a social network or a customer relationship management application.

5. The system of claim 1, further comprising an aggregation component for aggregating the user identities to a database where each of the user identities is hierarchically mapped into the meta-identity according to confidence ratings.

6. The system of claim 1, further comprising a collection component for collecting the user identities from disparate data sources.

7. The system of claim 1, further comprising a federation component for federating the meta-identity to a different communications system to maintain consistent call routing functionality.

8. The system of claim 1, further comprising a conflict resolution component for resolving conflicts between users having similar meta-identities.

9. A computer-implemented call routing system, comprising:
    a collection component for collecting user identities of a caller on a communications infrastructure from data sources;
    an aggregation component for aggregating and associating the user identities with a meta-identity of the caller;
    a rules component for assigning a call routing rule to the meta-identity; and
    a routing component for applying the call routing rule to a call from the caller based on the meta-identity.

10. The system of claim 9, wherein the user identities include a partial phone number that is normalized into a full phone number format.

11. The system of claim 9, wherein the user identities comprise at least one of a name, a phone number of the caller, or caller information collected from a data source.

12. The system of claim 9, wherein the user identities are mapped to the meta-identity and stored according to a hierarchy of confidence ratings.

13. The system of claim 9, further comprising a tagging component for tagging the one or more user identities with one or more corresponding data source identifiers that designate data sources of the user identities.

14. The system of claim 13, further comprising a conflict resolution component for selecting a call routing path between callers having similar meta-identities based on confidence ratings of the corresponding data source identifiers.

15. A computer-implemented call routing method, comprising:
    collecting alternate identities of a user from data sources;
    aggregating the alternate identities with a meta-identity of the user;
    assigning a routing rule for a call of the user based on the meta-identity; and
    routing the call based on the meta-identity and the routing rule.

16. The method of claim 15, further comprising normalizing a partial phone number of an alternate identity into a full phone number format.

17. The method of claim 15, further comprising mapping the alternate identities into the meta-identity according to a hierarchy of confidence ratings.

18. The method of claim 15, further comprising federating the meta-identity to a different communications system to maintain consistent call routing functionality.

19. The method of claim 15, further comprising tagging the alternate identities with one or more corresponding data source identifiers that designate respective sources of the user identities.

20. The method of claim 19, further comprising resolving call routing between callers having similar meta-identities based on a confidence level of the corresponding data source identifiers.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,320,549 B2 | |
| APPLICATION NO. | : 12/486778 | |
| DATED | : November 27, 2012 | |
| INVENTOR(S) | : Ramanathan et al. | |

It is certified that error appears in the above-identified patent and that said Letters Patent is hereby corrected as shown below:

In The Specification

In column 7, line 27, delete "a a" and insert -- a --, therefor.

Signed and Sealed this
Third Day of February, 2015

Michelle K. Lee
*Deputy Director of the United States Patent and Trademark Office*